(12) United States Patent
Vila et al.

(10) Patent No.: US 11,310,660 B2
(45) Date of Patent: Apr. 19, 2022

(54) IDENTIFYING NETWORK RISK

(71) Applicant: International Business Machines Corporation, Armonk, NY (US)

(72) Inventors: Ashkan Vila, Kassel (DE); Volker Vogeley, Bad Sooden-Allendorf (DE); Artemiy Aleksandrovich Solyakov, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 16/695,304

(22) Filed: Nov. 26, 2019

(65) Prior Publication Data

US 2021/0160688 A1 May 27, 2021

(51) Int. Cl.
*H04W 12/00* (2021.01)
*H04W 12/08* (2021.01)

(52) U.S. Cl.
CPC ......... *H04W 12/009* (2019.01); *H04W 12/08* (2013.01)

(58) Field of Classification Search
CPC ... H04L 29/06; H04L 9/32; H04L 9/00; H04L 63/1441; H04L 63/1433; H04L 63/1408; H04L 63/101; H04L 63/1416; H04L 63/0209; H04L 63/1425; H04L 63/14; H04L 63/0272; H04J 3/16; G06F 21/00; H04W 12/00; H04W 12/08; H04W 12/009; H04W 12/67; H04W 12/66
See application file for complete search history.

(56) References Cited

U.S. PATENT DOCUMENTS

| | | | | |
|---|---|---|---|---|
| 7,782,902 | B2 * | 8/2010 | Deerman | H04L 61/2514 370/469 |
| 7,916,861 | B2 * | 3/2011 | Conley | H04L 63/18 380/33 |
| 8,832,832 | B1 * | 9/2014 | Visbal | H04L 63/1408 726/22 |
| 9,100,428 | B1 | 8/2015 | Visbal | |
| 10,958,662 | B1 * | 3/2021 | Sole | H04L 63/105 |
| 2003/0212802 | A1 * | 11/2003 | Rector | H04L 41/08 709/228 |
| 2007/0130468 | A1 * | 6/2007 | Cunningham | H04L 41/12 713/176 |
| 2014/0041029 | A1 | 2/2014 | Zhou | |
| 2014/0096251 | A1 * | 4/2014 | Doctor | G06F 21/55 726/23 |
| 2017/0214709 | A1 | 7/2017 | Maestas | |

FOREIGN PATENT DOCUMENTS

WO  2014059534 A1  4/2014

OTHER PUBLICATIONS

Mell et al., "The NIST Definition of Cloud Computing", Recommendations of the National Institute of Standards and Technology, Sep. 2011, 7 pages.

* cited by examiner

*Primary Examiner* — Thanhnga B Truong
(74) *Attorney, Agent, or Firm* — Donald J. O'Brien

(57) ABSTRACT

Embodiments are disclosed for a method for identifying network risk. The method includes determining that a computing device has created a new connection to a network. Additionally, the method includes determining the public internet protocol (public IP) address of the exit point used by the network. Further, the method includes determining a reputation rating of the network based on the public IP address of the exit point. The method also includes provid- (Continued)

ing a notification indicating the reputation rating of the network.

16 Claims, 6 Drawing Sheets

IDENTIFYING NETWORK RISK

BACKGROUND

The present disclosure relates to network risk, and more specifically, to identifying network risk in network environments.

Staying online is one of the demands of modern society that can involve being often connected to one public network or another (e.g., in airports, coffee shops, restaurants and others). However, being on the move means that it may not be possible sometimes to adequately evaluate the risks of connecting to an unknown public network.

SUMMARY

Embodiments are disclosed for a method for identifying network risk. The method includes determining that a computing device has created a new connection to a network. Additionally, the method includes determining the public internet protocol (public IP) address of the exit point used by the network. Further, the method includes determining a reputation rating of the network based on the public IP address of the exit point. The method also includes providing a notification indicating the reputation rating of the network.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
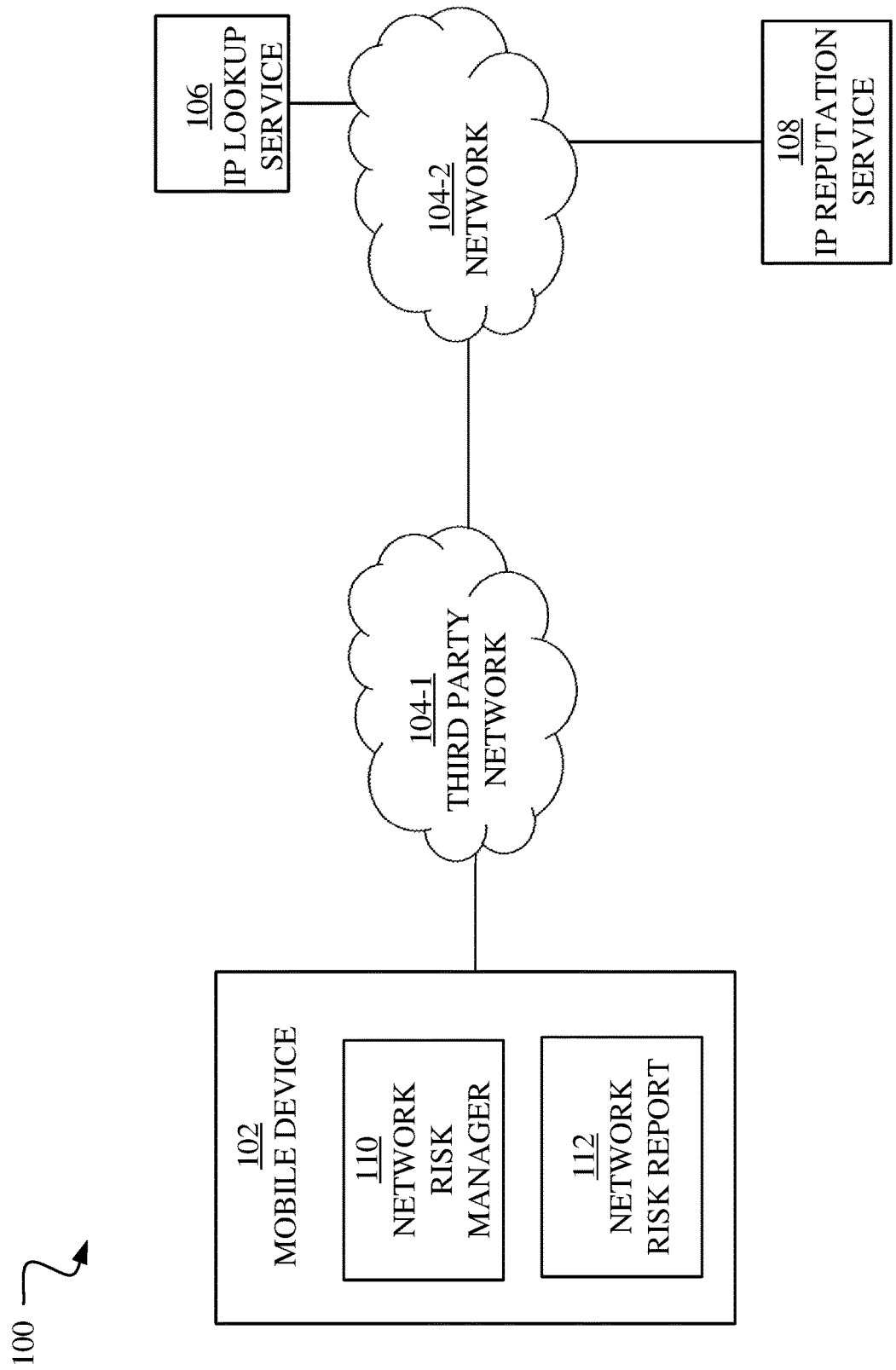
FIG. 1 is a block diagram of an example system for identifying network risk, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Currently, many solutions exist for protecting computing devices from cyber attacks and other online threats. For example, possible solutions can include but are not limited to: personal firewalls, anti-virus software, user access control systems, security event and incident monitoring tools, intrusion prevention and detection systems, security audits and physical protection. Such tools may be useful for policing the transactions that take place over network connections. For example, if a tablet attempts to load a web page from a compromised website, such tools can prevent the web page from loading and even terminate the connection to that website. However, regardless of how safe a smartphone or laptop may be, every day brings the possibility of a new zero-day vulnerability for which no computer system may be safe. A zero-day vulnerability can be a new, unknown virus or other computer hack.

Thus, connecting to an unknown, e.g., third-party, network can bring the risk of connecting to a poorly secured network that is already exploited by cyber criminals, leaving the users of the unknown network vulnerable to being hacked. The term, third party network can refer to a network that the owner of a device connecting to the network does not control or own. The hacking can take place through already infected systems in the unknown network, resulting in the network users losing sensitive information, becoming part of a botnet, and the like.

A network can be considered as secure as its weakest element. Hence, it is useful to be aware of threats coming out of networks to which computer devices can connect. In this way, it may be possible for computer device users to make an informative decision whether to stay connected to the network or to disconnect from the network.

Thus, current computing devices that are used on third-party networks can lack a network security overview, thus leaving such computing devices potentially exposed to cyber criminals or other online threats.

Accordingly, embodiments of the present disclose can treat a third-party network like a black box, where the only thing the computing device is aware of is the public internet protocol (IP) address of the third-party network's exit point. The exit point can refer to the router that connects a local network to the Internet, for example. Thus, the public IP address of the exit point can refer to the IP address by which the router that connects the third-party network to a public network such as, the Internet, is known. The IP address of the exit point can be reliably used to score the network reputation. Further, the IP address of the exit point can serve as an index in a security database to retrieve entries of known security threats associated with this IP address. The IP address of the exit point is routable and unique. Therefore, the IP address of the exit point can uniquely identify the network in question.

Thus, if a system inside this black box attacks an external system or is a botnet client, embodiments can label the whole black box, i.e., third-party network as dangerous. In contrast to a personal firewall installed on a laptop, these techniques do not police network connections. Further, unlike anti-virus software, these techniques can operate on a larger scale by assessing the whole of the third-party network instead of the single computing device connecting to the third-party network. While user access control systems define what a user can and cannot do, techniques described herein can give the third-party network a risk score based on the reputation of the public IP address of the exit point without imposing the restrictions of user access control systems. Additionally, in contrast to security event and incident monitoring tools, embodiments described herein can rank the third-party network with a score. The score can be based on known threats coming out of this network instead of performing active or passive monitoring of network connections.

FIG. 1 is a block diagram of an example system 100 for identifying network risk, in accordance with embodiments of the present disclosure. The system 100 includes a mobile device 102, third-party network 104-1, network 104-2, IP lookup service 106, and IP reputation service 108. The mobile device 102 can be a computing device, such as, a smartphone, laptop computer, tablet, and the like configured for network communications. The third-party network 104-1 can be a computer communication network, such as a local area network (LAN) or peer network. The third-party network 104-1 can provide connectivity to a network 104-2, which can include one or more computer communication networks, such as a wide area network (WAN). For example, the third-party network 104-1 can be a wireless access point in a cafe that provides access to the Internet in network 104-2.

The IP lookup service 106 can be a cloud service, for example, that identifies an IP address for a specific computing system, including, the mobile device 102 and the router that may run the third-party network 104-1. The IP reputation service 108 can also be a cloud service, however, one that can provide an indication of the trustworthiness of a predetermined IP address or a network segment containing the predetermined IP address. The IP reputation service 108 can include computer applications that allow users of specific networks and/or websites to rate these websites and networks in an online community. The IP reputation service 108 can be provided by a security and/or intelligence provider. In this way, the IP reputation service 108 can aggregate these ratings to determine a trustworthiness score for specific IP addresses.

According to some embodiments of the present disclosure, the mobile device 102 can include a network risk manager 110 and a network risk report 112. The network risk manager 110 can be a computer application running on the mobile device 102 that can determine when the mobile device 102 creates a new network connection to a network, such as the third-party network 104-1. Further, the network risk manager 110 can determine the public IP address of the exit point of the third-party network 104-1. Thus, once the mobile device 102 is connected to the third-party network 104-1, the network risk manager 110 can determine the public IP address of the exit point of the third-party network 104-1 by making a request of the IP lookup service 106. In this example, the public IP address of the exit point can refer to the IP address by which the router that runs the third-party network 104-1 is known to the network 104-2. In contrast to the public IP address of the exit point, this router may also have an internal IP address by which computing devices connected to the third-party network 104-1 refer to the router.

Once the public IP address of the exit point for the third-party network 104-1 is known, the network risk manager 110 can determine the reputation of the third-party network 104-1 by providing the public IP address of the exit point to the IP reputation service 108. The IP reputation service 108 can provide a numeric rating from zero to ten, for example, with the zero end of the scale representing a safe network, and the ten end of the scale representing an unsafe network. Accordingly, the network risk manager 110 can generate the network risk report 112. The network risk report 112 can include the network rating provided by the IP reputation service 108, and other relevant information, such as known risks associated with the third-party network 104-1.

If the IP reputation service 108 does not have a record for the network or network exit point, the network risk manager 110 can use a different IP reputation service (from a predefined list). Alternatively, the network risk manager 110 can inform/notify the user that the reputation of the third-party network 104-1 is unknown.

Figure 2:
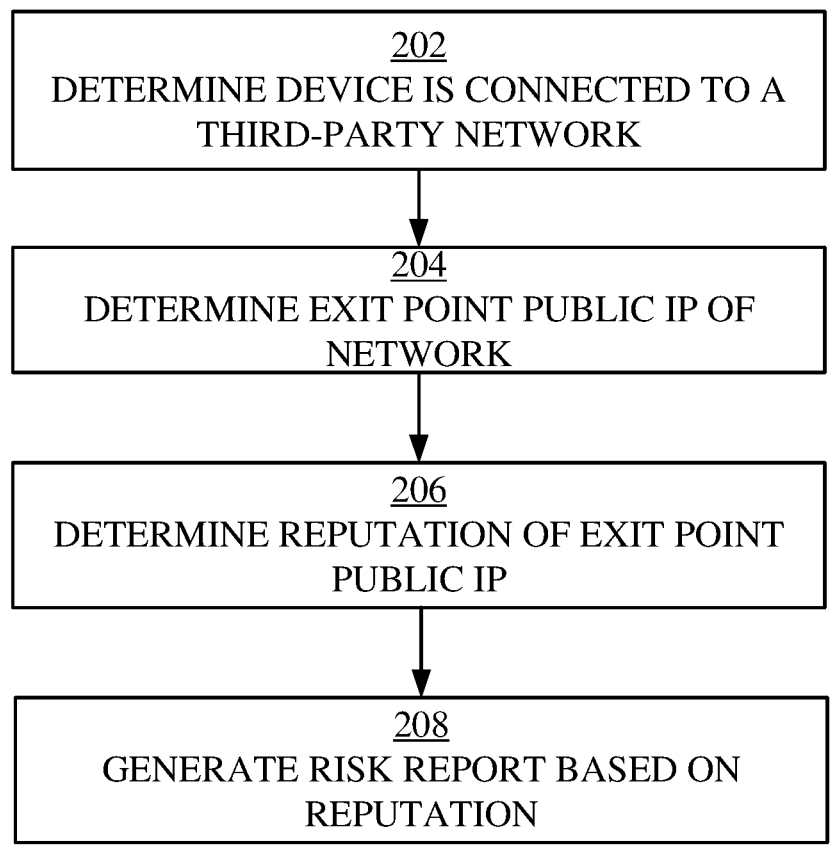
FIG. 2 is a flow chart of an example method for identifying network risk, in accordance with embodiments of the present disclosure.

FIG. 2 is a flow chart of an example method 200 for identifying network risk, in accordance with some embodiments of the present disclosure. In accordance with some embodiments of the present disclosure, a network risk manager, such as the network risk manager 110 described with respect to FIG. 1 can perform the method 200. The report can also include a button that can be clicked to disconnect the connection, or the connection can be automatically disconnected when a specific risk threshold is met.

At block 202, the network risk manager 110 can determine that a computing device is connected to a third-party network, such as the third-party network 104-1 described with respect to FIG. 1. For example, the network risk manager 110 can detect a change in the network configuration of a mobile device, such as the mobile device 102, by monitoring local network interfaces. Local network interfaces can be network components of the mobile device, such as a network interface card. Alternatively, the network risk manager 110 can determine that the mobile device 102 is connected to the third-party network 104-1 by actively probing an exit point IP address of the third-party network 104-1 using an IP lookup service, such as the IP lookup service 106. Actively probing the exit point IP address can be useful when it is not possible to monitor local network interfaces, because the changes at the exit point IP address can be made relatively faster than at other IP addresses, and thus, easier to detect.

At block 204, the network risk manager 110 can determine the public IP address of the exit point of the third-party network 104-1. The network risk manager 110 can determine the public IP address of the exit point with a request to the IP lookup service 106 as described with respect to block 202, or in a separate request.

At block 206, the network risk manager 110 can determine the reputation of the public IP address of the exit point of the third-party network 104-1. According to some embodiments of the present disclosure, the network risk manager 110 can determine the reputation by providing the public IP address of the exit point in a request to the IP reputation service 108. In response, the IP reputation service 108 can provide a reputation rating.

At block 208, the network risk manager 110 can generate a risk report based on the reputation rating. The risk report can include a numeric rating of the third-party network 104-1. Alternatively, or additionally, the risk report can include descriptions of known risks in the third-party network 104-1. In some embodiments, the report can also include a selectable interface to disconnect the connection. For example, the bottom of the risk report can include a button that can be clicked to disconnect the connection. Alternatively or additionally, the connection can be automatically disconnected when a specific risk threshold is met.

For example, TABLE 1 shows the Reputation Rating and Message that can be included in three example network risk reports 112. The Reputation Rating can include a numeric value (on a scale from 1 to 10) indicating a confidence score in the assessment of the risks labeled in the corresponding Message.

TABLE 1

| Reputation Rating | Message |
| --- | --- |
| 8.6 | IP Address xx.xxx.xx.xx |
| | Botnet Command and Control Server |
| 4.3 | IP Address yy.yyy.yy.yy |
| | Anonymization Services |
| | Malware |
| | Botnet Command and Control Server |
| 1 | IP Address zz.zzzz.zz.zz |

For example, row 1 of TABLE 1 indicates that the Reputation Rating is 8.6. Further, the Message indicates the public IP address of the exit point and a potential label for the public IP address of the exit point as a Botnet Command and Control Server. The 8.6 Reputation Rating can indicate that the IP reputation service 108 can assign an 86% confidence score to the view of this address as a threat. As such, mobile device 102 connected to a network segment associated with this public IP address of the exit point is at a relatively high risk of being infected.

Further, row 2 of TABLE 1 indicates that the Reputation Rating is 4.3. Further, the Message indicates the public IP address of the exit point and potential labels for the public IP address of the exit point as Anonymization Services, Malware, and a Botnet Command and Control Server. The 4.3 Reputation Rating can indicate that the IP reputation service 108 can assign a 43% confidence score to the view of this address as a threat. As such, mobile device 102 connected to a network segment associated with this public IP address of the exit point is at a relatively moderate risk of being infected.

Additionally, row 3 of TABLE 1 indicates that the Reputation Rating is 1. Further, the Message merely indicates the public IP address of the exit point and has no potential labels. The 1 Reputation Rating can indicate that the IP reputation service 108 can assign a 10% confidence score to the labelling of this IP address as a threat. As such, mobile device 102 connected to a network segment associated with this public IP address of the exit point is at a relatively low risk of being infected. The lack of labels in the Message further indicates that the public IP address of the exit point presents no known threats, meaning that this network segment may be safe.

If the IP reputation services 108 do not have any information about the exit point, the network risk manager 110 can provide a message indicating that the reputation is unknown. Further, if the network risk manager 110 uses multiple IP reputation services 108, the network risk manager can combine the reputation scores using a weighted sum, e.g., combined score=alpha*score1+beta*score2+ . . . , where alpha, beta etc. are normed weights that reflect the reliability of the IP reputation services 108, respectively.

Figure 3:
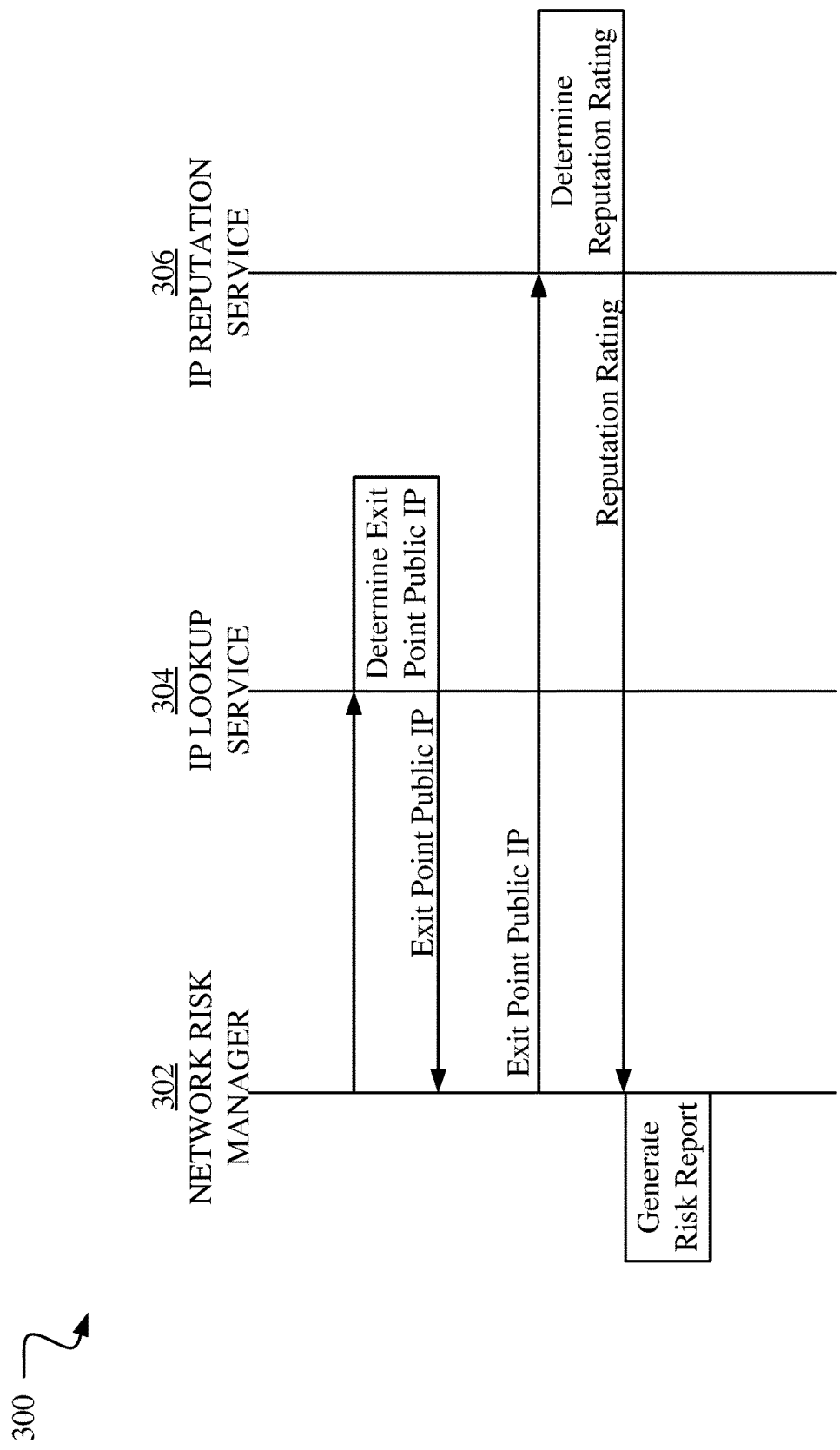
FIG. 3 is a message flow diagram of an example method for identifying network risk, in accordance with embodiments of the present disclosure.

FIG. 3 is a message flow diagram of an example method 300 for identifying network risk, in accordance with embodiments of the present disclosure. The method 300 can represent the operations 204 through 208 of the example method 200. The method 300 can involve asynchronous electronic communications between a network risk manager 302, an IP lookup service 304, and an IP reputation service 306. The network risk manager 302 can be similar to the network risk manager 110 described with respect to FIG. 1. Further, the IP lookup service 304 can be similar to the IP lookup service 106. Additionally, the IP reputation service can be similar to the IP reputation service 108.

The method 300 involves the network risk manager 302 sending a request to the IP lookup service 304 for the exit point public IP of the third-party network 104-1. In response to the request, the IP lookup service 304 can provide the exit point public IP for the network risk manager 302.

Additionally, the method 300 involves the network risk manager 302 sending a request to the IP reputation service 306 that includes the public IP address of the exit point for the third-party network 104-1. Accordingly, the IP reputation service 306 can determine the reputation rating for the exit point public IP. Further, the IP reputation service 306 can provide a response to the network risk manager 302 that includes the reputation rating for the public IP address of the exit point. Thus, the network risk manager 302 can generate a risk report, such as the network risk report 112 described with respect to FIG. 1. The network risk report 112 can include the reputation rating, and any additional information provided by the IP reputation service 306.

Figure 4:
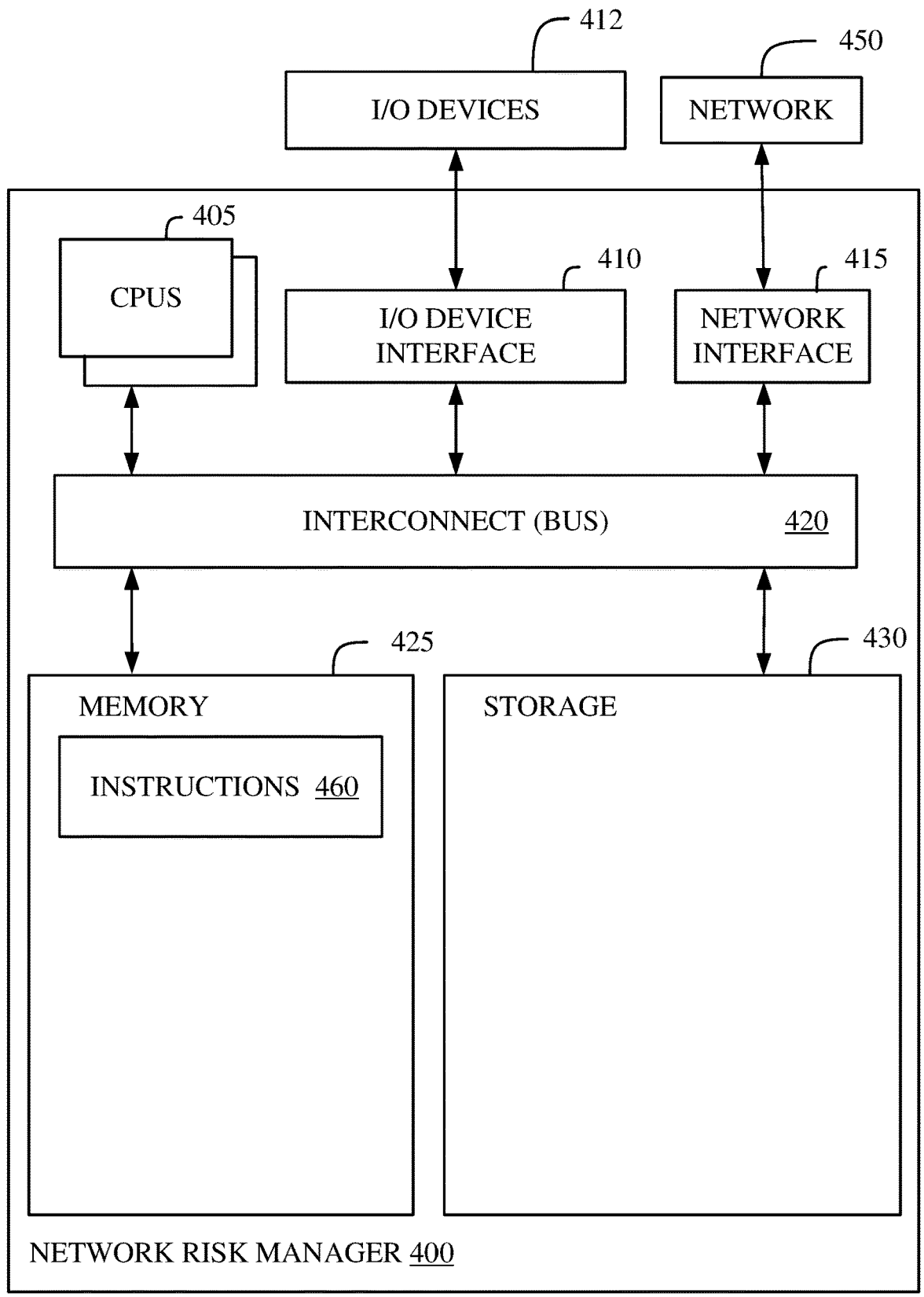
FIG. 4 is a block diagram of an example network risk manager, in accordance with some embodiments of the present disclosure.

Referring now to FIG. 4, illustrated is a block diagram of an example network risk manager 400, in accordance with some embodiments of the present disclosure. In various embodiments, the network risk manager 400 is similar to the network risk manager 218 and can perform the methods described in FIGS. 2-3 and/or the functionality discussed in FIG. 1. In some embodiments, the network risk manager 400 provides instructions for the aforementioned methods and/or functionalities to a client machine such that the client machine executes the method, or a portion of the method, based on the instructions provided by the network risk manager 400. In some embodiments, the network risk manager 400 comprises software executing on hardware incorporated into a plurality of devices.

The network risk manager 400 includes a memory 425, storage 430, an interconnect (e.g., BUS) 420, one or more CPUs 405 (also referred to as processors 405 herein), an I/O device interface 410, I/O devices 412, and a network interface 415.

Each CPU 405 retrieves and executes programming instructions stored in the memory 425 or the storage 430. The interconnect 420 is used to move data, such as programming instructions, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random access memory (e.g., static random access memory (SRAM), dynamic random access memory (DRAM), or Flash). The storage 430 is generally included to be representative of a non-volatile memory, such as a hard disk drive, solid state device (SSD), removable memory cards, optical storage, and/or flash memory devices. Additionally, the storage 430 can include storage area-network (SAN) devices, the cloud, or other devices connected to the network risk manager 400 via the I/O device interface 410 or to a network 450 via the network interface 415.

In some embodiments, the memory 425 stores instructions 460. However, in various embodiments, the instructions 460 are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all, any of the method of FIG. 2 and/or the functionality discussed in FIGS. 1 and 3.

In various embodiments, the I/O devices 412 include an interface capable of presenting information and receiving input. For example, I/O devices 412 can present information to a listener interacting with network risk manager 400 and receive input from the listener.

The network risk manager 400 is connected to the network 450 via the network interface 415. Network 450 can comprise a physical, wireless, cellular, or different network.

In some embodiments, the network risk manager 400 can be a multi-user mainframe computer system, a single-user system, or a server computer or similar device that has little or no direct user interface but receives requests from other computer systems (clients). Further, in some embodiments, the network risk manager 400 can be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary network risk manager 400. In some embodiments, however, individual components can have greater or lesser complexity than as represented in FIG. 4, components other than or in addition to those shown in FIG. 4 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
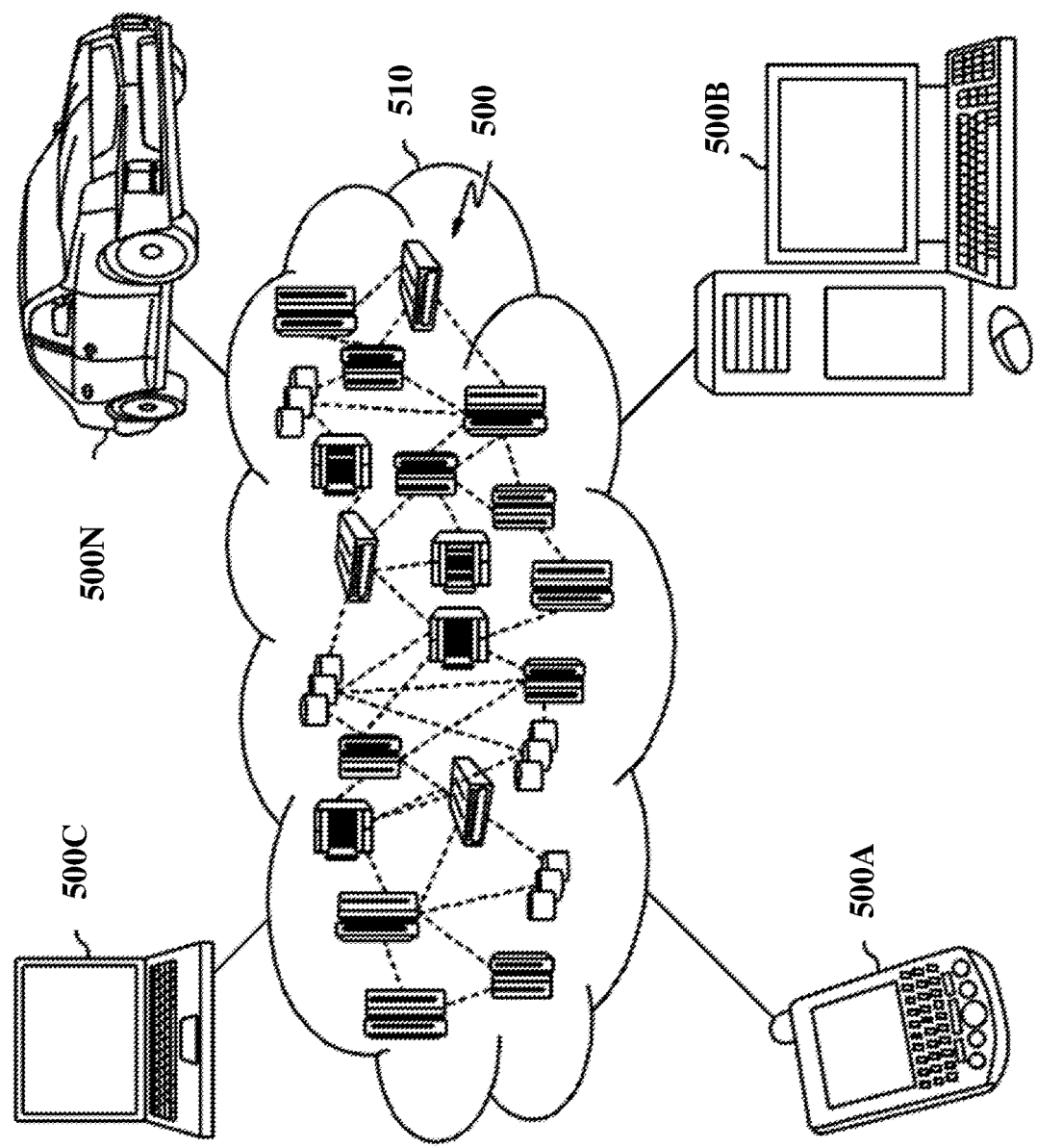
FIG. 5 depicts a cloud computing environment, according to some embodiments of the present disclosure.

Referring now to FIG. 5, which depicts a cloud computing environment 510, according to some embodiments of the present disclosure. As shown, cloud computing environment 510 includes one or more cloud computing nodes 500. The cloud computing nodes 500 can perform the methods described in FIGS. 2-3 and/or the functionality discussed in FIG. 1. Additionally, cloud computing nodes 500 can communicate with local computing devices used by cloud consumers, such as, for example, personal digital assistant (PDA) or cellular telephone 500A, desktop computer 500B, laptop computer 500C, and/or automobile computer system 500N. Further, the cloud computing nodes 500 can communicate with one another. The cloud computing nodes 500 can also be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
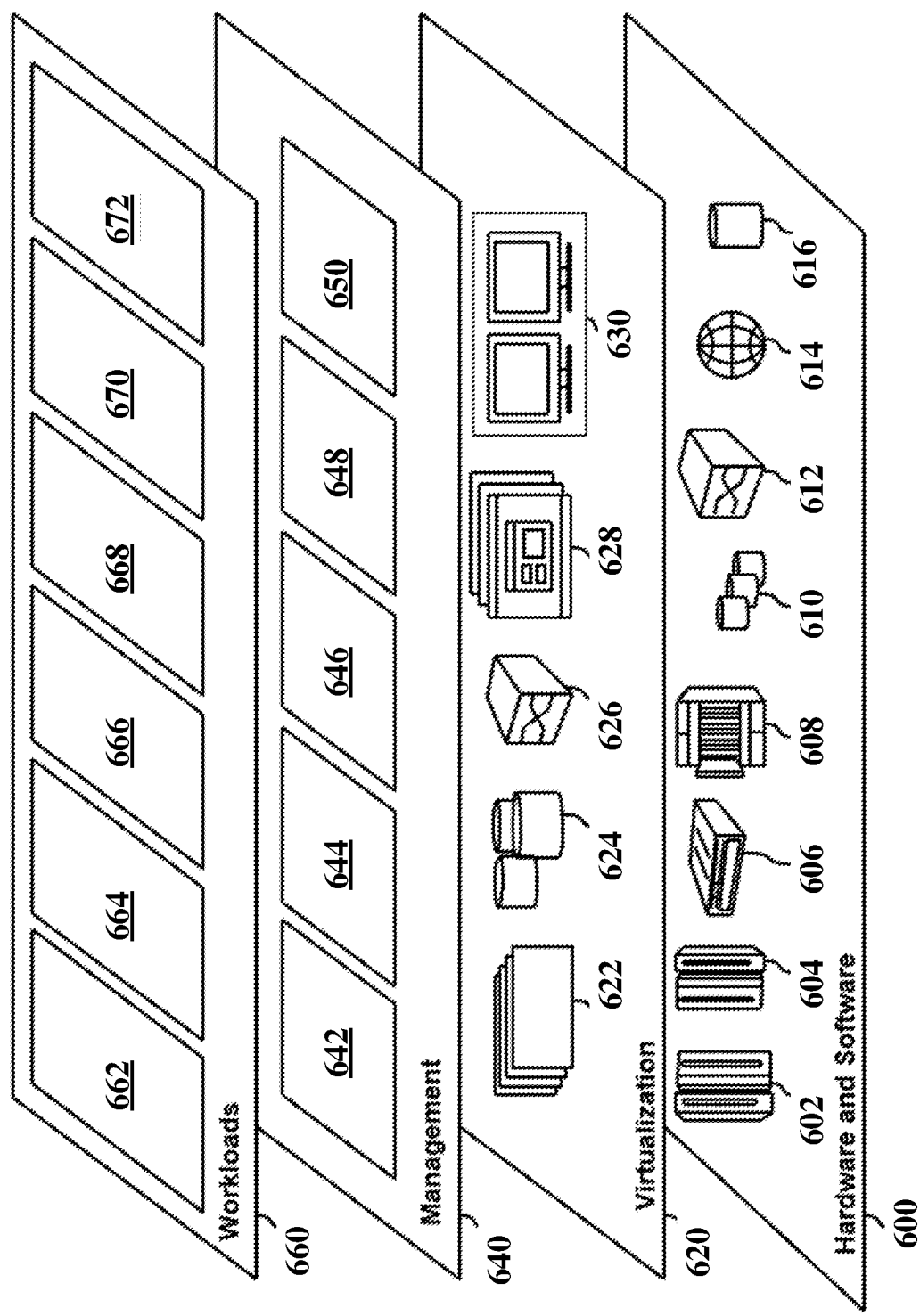
FIG. 6 depicts abstraction model layers, according to some embodiments of the present disclosure.

Referring now to FIG. 6, a set of functional abstraction model layers provided by cloud computing environment 510 (FIG. 5), according to some embodiments of the present disclosure, is shown. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities can be provided: virtual servers 622; virtual storage 624; virtual networks 626, including virtual private networks; virtual applications and operating systems 628; and virtual clients 630.

In one example, management layer 640 can provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 can allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment can be utilized. Examples of workloads and functions which can be provided from this layer include: mapping and navigation 662; software development and lifecycle management 664; virtual classroom education delivery 666; data analytics processing 668; transaction processing 670; and network risk manager 672.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for identifying network risk, comprising:
    determining that a computing device has created a new connection to a network;
    determining a public internet protocol (public IP) address of an exit point used by the network;
    determining a reputation rating of the network based on the public IP address of the exit point;
    generating a risk report comprising the reputation rating, and a selectable interface that terminates the new connection to the network in response to a selection of the selectable interface; and
    terminating the new connection to the network based on the reputation and a predetermined reputation threshold.

2. The method of claim 1, wherein determining the reputation rating of the network comprises requesting the reputation rating from an IP reputation service.

3. The method of claim 2, wherein requesting the reputation rating comprises providing the public IP address of the exit point for the IP reputation service.

4. The method of claim 1, wherein the network is a third-party network that provides access to a wide area network (WAN).

5. The method of claim 4, wherein the WAN is the Internet.

6. The method of claim 1, wherein determining that the computing device has created the new connection to the network comprises probing the public IP address of the exit point using an IP lookup service.

7. The method of claim 1, wherein determining the public IP address of the exit point comprises requesting the exit point public IP address from an IP lookup service.

8. A computer program product comprising program instructions stored on a computer readable storage medium, wherein the computer readable storage medium is not a transitory signal per se, the program instructions executable by a processor to cause the processor to perform a method comprising:
    determining that a computing device has created a new connection to a network;
    determining a public internet protocol (public IP) address of an exit point used by the network;
    determining a reputation rating of the network based on the public IP address of the exit point;
    generating a risk report comprising the reputation rating, and a selectable interface that terminates the new connection to the network in response to a selection of the selectable interface; and
    terminating the new connection to the network based on the reputation and a predetermined reputation threshold.

9. The computer program product of claim 8, wherein determining the reputation rating of the network comprises requesting the reputation rating from an IP reputation service.

10. The computer program product of claim 9, wherein requesting the reputation rating comprises providing the public IP address of the exit point for the IP reputation service.

11. The computer program product of claim 8, wherein the network is a third-party network that provides access to a wide area network (WAN).

12. The computer program product of claim 11, wherein the WAN is the Internet.

13. The computer program product of claim 8, wherein determining that the computing device has created the new connection to the network comprises probing the public IP address of the exit point using an IP lookup service.

14. The computer program product of claim 8, wherein determining the public IP address of the exit point comprises requesting the exit point public IP address from an IP lookup service.

15. A system comprising:

a computer processing circuit; and a computer-readable storage medium storing instructions, which, when executed by the computer processing circuit, are configured to cause the computer processing circuit to perform a method comprising:

determining that a computing device has created a new connection to a network;

determining a public internet protocol (public IP) address of an exit point used by the network;

determining a reputation rating of the network based on the public IP address of the exit point;

generating a risk report comprising the reputation rating, and a selectable interface that terminates the new connection to the network in response to a selection of the selectable interface;

terminating the new connection to the network based on the reputation and a predetermined reputation threshold.

16. The system of claim 15, wherein:

determining the reputation rating of the network comprises requesting the reputation rating from an IP reputation service; and requesting the reputation rating comprises providing the public IP address of the exit point for the IP reputation service.

* * * * *